United States Patent [19]

Spencer et al.

[11] Patent Number: 4,743,981

[45] Date of Patent: May 10, 1988

[54] SYSTEM FOR SYNCHRONIZING AUDIOTAPE AND VIDEOTAPE MACHINES

[75] Inventors: David W. Spencer, Valencia; Gregory S. Kadorian, Simi Valley, both of Calif.

[73] Assignee: Walt Disney Productions, Burbank, Calif.

[21] Appl. No.: 824,637

[22] Filed: Jan. 31, 1986

[51] Int. Cl.⁴ ............................................. G11B 5/86
[52] U.S. Cl. ....................................... 360/15; 360/13; 360/73
[58] Field of Search ............................ 360/14.1–14.3, 360/15, 13, 72.2, 73; 369/69, 70

[56] References Cited

U.S. PATENT DOCUMENTS

| 3,535,467 | 10/1970 | Thieme et al. | 360/15 X |
|---|---|---|---|
| 4,210,939 | 7/1980 | Ninomiya et al. | 360/14.3 |
| 4,214,278 | 7/1980 | Hunt et al. | 360/14.3 |
| 4,360,843 | 11/1982 | Meneyes et al. | 360/72.2 |
| 4,363,049 | 12/1982 | Ohtsuki et al. | 360/13 |
| 4,375,655 | 3/1983 | Korth et al. | 360/15 |
| 4,394,694 | 7/1983 | Ninomiya et al. | 360/14.3 |
| 4,404,602 | 9/1983 | Hoshimi et al. | 360/13 |
| 4,446,490 | 5/1984 | Hoshimi et al. | 360/13 X |
| 4,471,390 | 9/1984 | Hamann | 360/15 |
| 4,491,879 | 1/1985 | Fine | 360/14.1 |
| 4,496,997 | 1/1985 | Ohtsuki | 360/13 |
| 4,675,757 | 6/1987 | Block | 360/73 |

FOREIGN PATENT DOCUMENTS 56-83846  7/1981  Japan ..................... 360/15
57-86137  5/1982  Japan ..................... 360/15

OTHER PUBLICATIONS

Swetland; "A New System for Synchronizing Magnetic Tape and Magnetic Film Transports for Television Post Production", SMPTE, vol. 88, Jul. 79, No. 71, pp. 483–485.
"Lip-Sync Editing and Mixing of Nonperforated Magnetic Tape Using the New Synchrolock Tape System", Bunting, SMPTE Journal, vol. 86, Jul. 77, pp. 482–486.
"Sypher: Videotape Sound Post Dubbing"; Eden-Eadon, SMPTE Journal, vol. 87, Aug. 78, pp. 504–507.

Primary Examiner—Aristotelis M. Psitos
Attorney, Agent, or Firm—Fulwider, Patton, Rieber, Lee & Utecht

[57] ABSTRACT

A method and apparatus for regulating the speed of a multitrack audiotape machine while recording audio from a multitrack audiotape onto a videotape. The speed of the audiotape machine is regulated by correlating a video synchronization signal previously recorded onto the audiotape with a video synchronization signal controlling the videotape recorder during the recording. Highly accurate synchronization between the two machines is achieved. This allows for the transfer of multiple audio tracks from the multitrack audiotape onto the videotape and then onto multiple laser videodiscs, such that during playback of the multiple laser videodiscs, the laser videodisc players can be synchronized with each other.

7 Claims, 3 Drawing Sheets

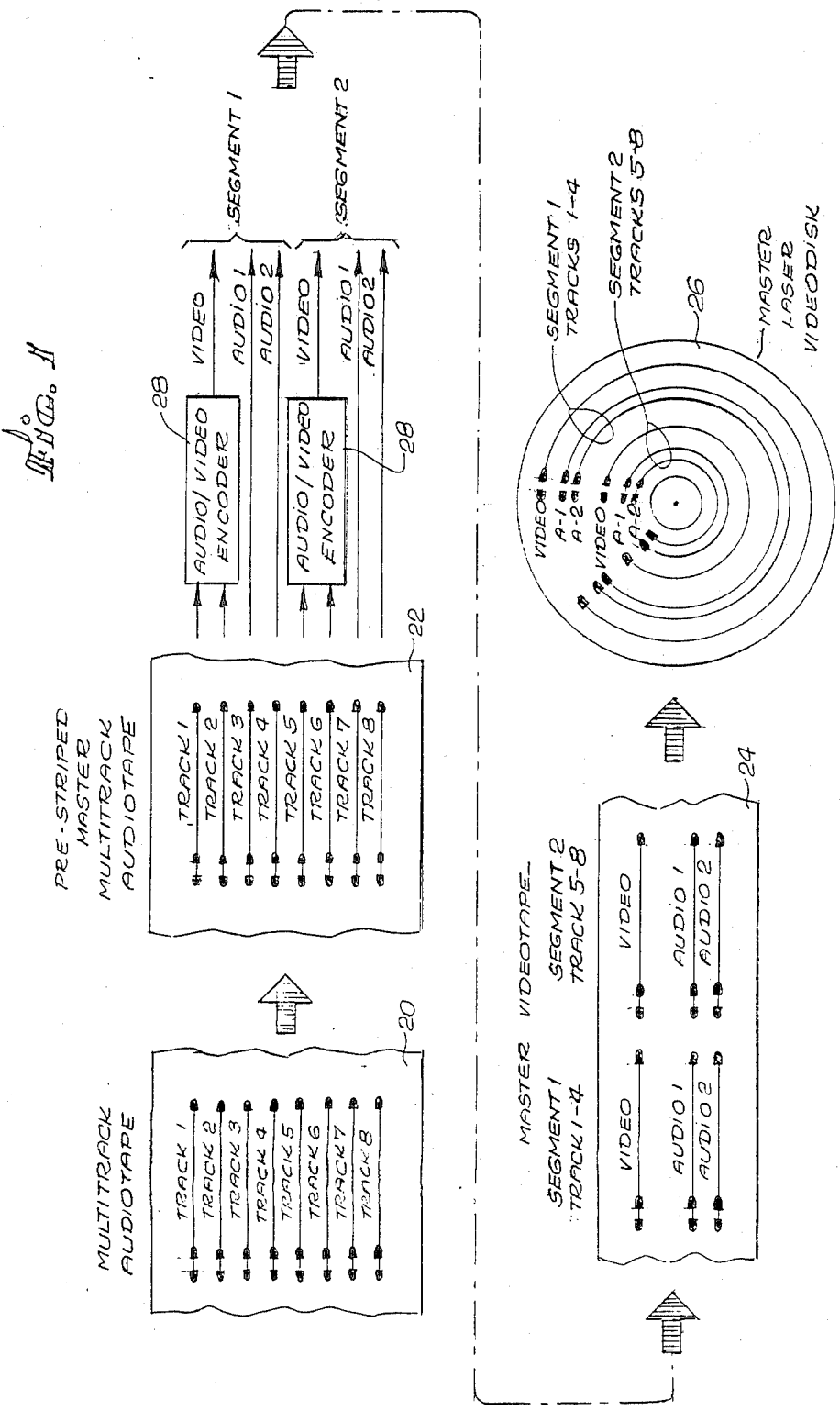

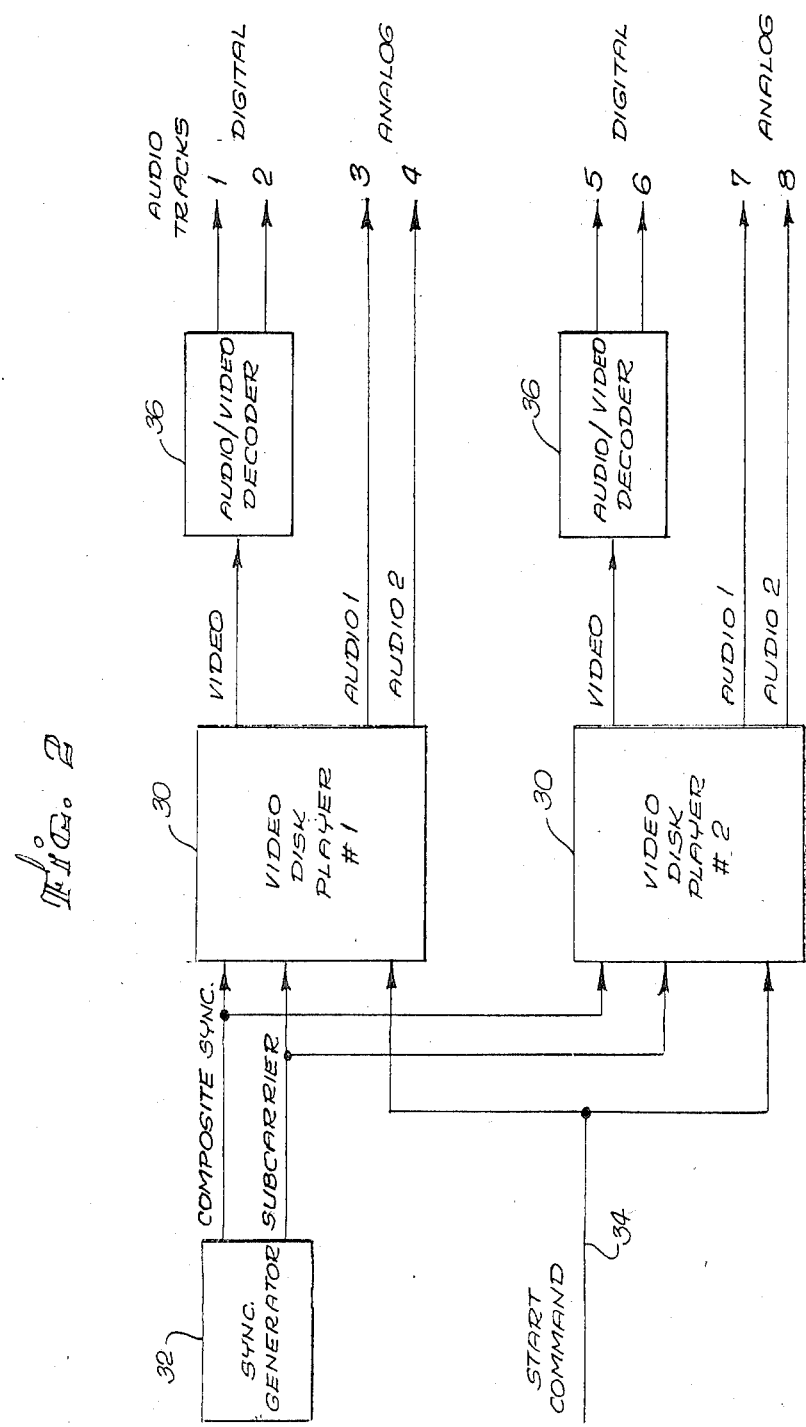

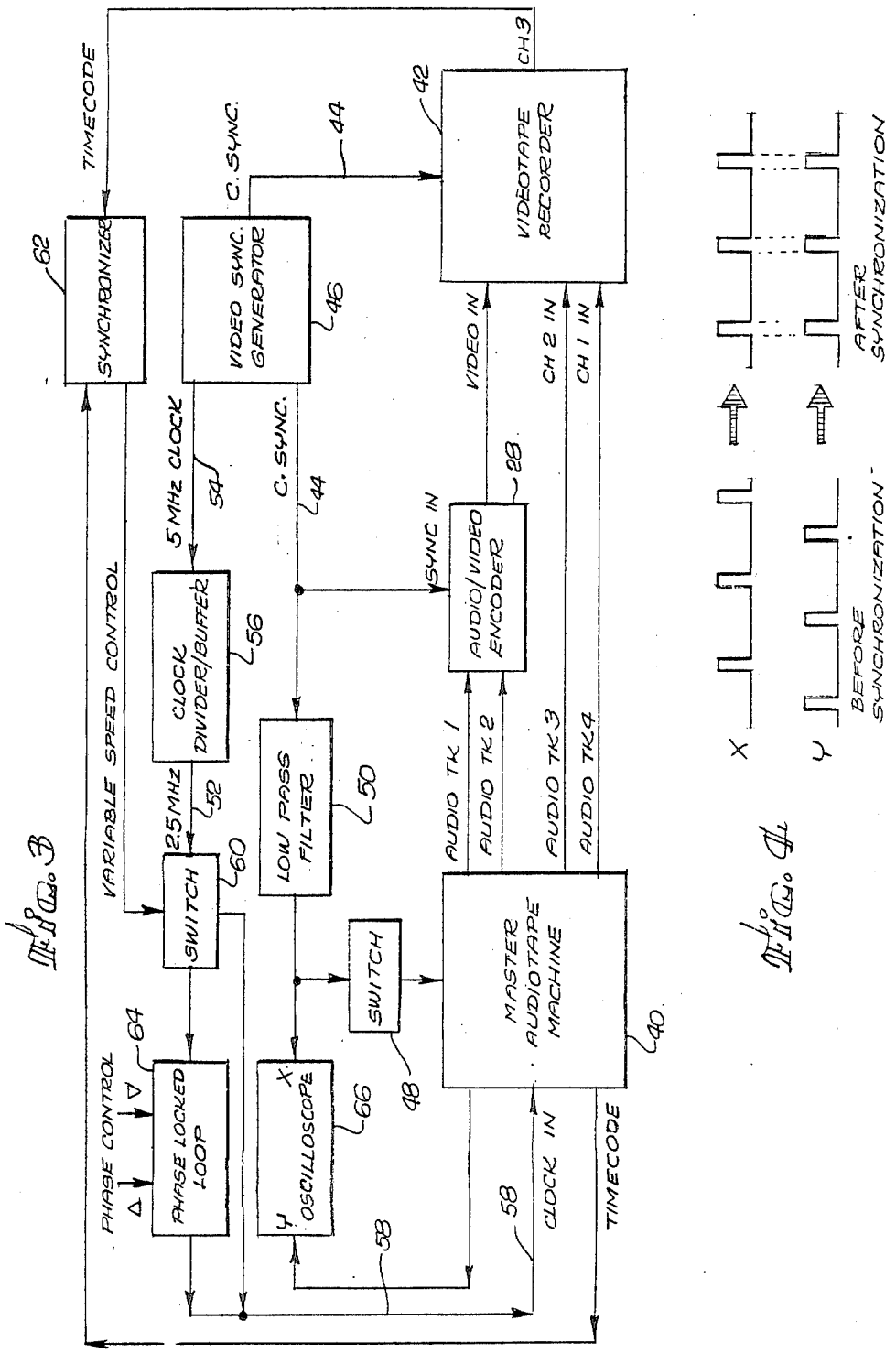

SYSTEM FOR SYNCHRONIZING AUDIOTAPE AND VIDEOTAPE MACHINES

BACKGROUND OF THE INVENTION

This invention relates generally to improvements in multitrack audio recording and playback systems and, more particularly, to a new and improved method and apparatus for recording multitrack audio from a multitrack audiotape onto multiple laser videodiscs for playback from multiple laser videodisc players. Recording the audio onto laser videodiscs allows for the exploitation of several of the advantages of laser videodisc technology, including the increased durability of laser videodiscs over audiotapes and the higher reliability and reduced maintenance of laser videodisc players over audiotape machines.

Multitrack audiotape machines are presently used to provide synchronized audio for animated and theater shows at some amusement parks. Some of the multiple tracks are used to carry wide bandwidth audio, such as music, and other tracks are used to carry narrow bandwidth audio, such as narration and sound effects. These multiple tracks are automatically synchronized to each other by virtue of their parallel placement on the same audiotape, and are synchronized to the various film projectors, animated characters, and other show elements by time codes recorded on one of the audio tracks. The multitrack audiotape machines are well suited for shows requiring more than about sixteen tracks, but because these machines are generally very costly and have poor reliability and high maintenance requirements, they are not well suited for smaller shows requiring a lesser number of tracks. Furthermore, such audiotape machines have no random access capability and the audiotapes typically wear out or degrade in quality with time.

Synchronized audio could be provided for these smaller shows by recording the multiple audio tracks onto multiple laser videodiscs. For example, a pair of channels of the wide bandwidth audio and a pair of channels of the narrow bandwidth audio could be recorded together on a single laser videodisc, with the two channels of wide bandwidth audio encoded in a video format on the laser videodisc. Such a laser videodisc would be created for each group of four channels from the multitrack audiotape. Multiple laser videodisc players would then be used to play back the multiple laser videodiscs, with the players synchronized to each other through their conventional gen-lock capability.

The laser videodisc approach has several advantages. Laser videodiscs do not wear out or degrade in quality with time as audiotapes do. The laser videodisc players are almost maintenance free and are highly reliable. Also, the laser videodisc players are much less expensive than the multitrack audiotape machines, and have random access capability, as well. Furthermore, the failure of one laser videodisc player will not cause the entire show to be interrupted.

The multiple laser videodiscs are created by first recording the groups of four channels from the multitrack audiotape onto a master multitrack audiotape. The groups of four channels are then recorded onto a master videotape, which is subsequently used to create a master laser videodisc for producing the multiple laser videodiscs. However, recording the audio from the master multitrack audiotape onto the master videotape requires multiple passes of the master multitrack audiotape. During each pass of the master multitrack audiotape, the master audiotape machine must be accurately synchronized to the videotape recorder. If the machines are not synchronized, the laser videodiscs that are later made from the master videotape will be unable to be accurately synchronized with each other during playback. Synchronizing a multitrack audiotape machine with a videotape recorder using typical SMPTE (Society of Motion Pictures and Television Engineers) timecode recorded on one of the audio tracks and prior art synchronizing equipment has provided a phase accuracy of approximately one hundredth of an SMPTE frame (one frame=1/30 second), or approximately 1800 degrees of phase error (5 cycles) at 15 KHz, between the two machines. This is not acceptable for multitrack stereo playback, or for sound that is panned from track to track, which requires a phase error of no more than about 20 degrees.

Accordingly, there has been a long existing need in the recording arts for a method and an apparatus for more accurately synchronizing a multitrack audiotape machine with a videotape recorder. The present invention clearly fulfills that need.

SUMMARY OF THE INVENTION

The present invention resides in a method and apparatus for providing improved accuracy in synchronizing an audiotape machine with a videotape recorder. Briefly, and in general terms, the system of a presently preferred embodiment of the invention, by way of example and not necessarily by way of limitation, involves accurately regulating the speed of a master multitrack audiotape machine during recording of audio tracks from a master multitrack audiotape onto a master videotape. The speed of the master multitrack audiotape machine is regulated by correlating a video synchronization signal previously recorded onto the master audiotape with a video synchronization signal controlling the videotape recorder during the recording. Synchronization to within about 20 degrees of phase error can be achieved with this method.

More specifically, the method of the present invention includes recording the multiple tracks of audio from a multitrack audiotape, such as presently used at some amusement parks, onto a master multitrack audiotape. For this transfer, the master multitrack audiotape is first pre-striped with an SMPTE timecode and a composite video synchronization signal, while the speed of the master multitrack audiotape machine is regulated by a master clock signal. The master clock signal is derived from the same video synchronization signal generator as the video synchronization signal being recorded onto the master multitrack audiotape. The audio is then recorded from the multitrack audiotape onto the pre-striped master multitrack audiotape, using SMPTE timecode for synchronizing the multitrack audiotape machine with the master multitrack audiotape machine.

The multiple tracks of audio from the master multitrack audiotape are then recorded onto the master videotape, four channels at a time. For this transfer, the master videotape is pre-striped with the same SMPTE timecode and composite video synchronization signal as the master multitrack audiotape. The master multitrack audiotape machine is then coarsely synchronized to the videotape recorder using conventional SMPTE synchronizing equipment.

Once the coarse synchronization is accomplished, the composite video synchronization signal previously recorded onto the master multitrack audiotape is compared on an oscilloscope with the composite video synchronization signal controlling the videotape recorder. The frequency of the master clock signal is then adjusted by a phase locked loop to vary the speed of the master multitrack audiotape machine until the vertical and horizontal synchronization pulses included in the composite video synchronization signal and previously recorded onto the master audiotape machine are aligned with the vertical and horizontal synchronization pulses included in the composite video synchronization signal controlling the videotape recorder. This accurately synchronizes the master multitrack audiotape machine with the videotape recorder.

The four channels of audio from the master multitrack audiotape are then selected and recorded onto the master videotape, using an audio to video encoder to encode the two channels of wide bandwidth audio. The audio to video encoder must be controlled by the same composite video synchronization signal as the videotape recorder when encoding the four channels of wide bandwidth audio. This process can be repeated, over and over again, until all of the audio channels have been transferred to the master videotape.

It will be appreciated from the foregoing that the present invention provides a highly accurate method and apparatus for synchronizing a multitrack audiotape machine with a videotape recorder.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

FIG. 1 is a diagrammatical view of the steps involved in transferring multiple tracks of audio from a multitrack audiotape to a master laser videodisc;

FIG. 2 is a block diagram of a system wherein multiple laser videodisc players are synchronized with each other;

FIG. 3 is a block diagram of one embodiment of a system for synchronizing a multitrack audiotape machine with a videotape recorder, in accordance with the invention; and FIG. 4 is a graph of synchronization pulses before and after a multitrack audiotrack machine is accurately synchronized with a videotape recorder.

DESCRIPTION OF THE PREFERRED EMBODIMENT

As shown in the drawings for purposes of illustration, the present invention is embodied in a method and apparatus for providing improved accuracy in synchronizing a multitrack audiotape machine with a videotape recorder.

Multitrack audiotape machines are presently used to provide synchronized audio for animated and theater shows at some amusement parks. However, because these machines are generally very costly and have poor reliability and high maintenance requirements, they are not well suited for smaller shows requiring less than about sixteen tracks. Synchronized audio could be provided for these smaller shows by recording the multiple audio tracks onto multiple laser videodiscs. For example, the multiple laser videodiscs could be created by recording groups of four channels from the multitrack audiotape onto a master multitrack audiotape. The groups of four channels would then be recorded onto a master videotape, which would subsequently be used to create a master laser videodisc for producing the multiple laser videodiscs. Multiple laser videodisc players would be used to play back the laser videodiscs. Laser videodiscs have several advantages over audiotapes, but recording the multiple audio tracks from the master multitrack audiotape onto the master videotape requires multiple passes of the master multitrack audiotape. This means that, during each pass of the audiotape, the master multitrack audiotape machine must be accurately synchronized to the videotape recorder. However, typical SMPTE timecode and prior art synchronizing equipment have not provided sufficient accuracy to meet the stringent phase requirements required for this transfer when stereo playback is involved.

In accordance with the system of the present invention, a master multitrack audiotape machine is synchronized to a videotape recorder using a composite video synchronization signal as a time base reference. In a presently preferred embodiment of the invention, the speed of the master multitrack audiotape machine is regulated while recording the multiple audio tracks from the master multitrack audiotape onto the master videotape. This speed regulation is accomplished by correlating a video synchronization signal previously recorded onto the audiotape with a video synchronization signal controlling the videotape recorder during the recording.

FIG. 1 illustrates the basic steps used to transfer multiple tracks of audio from a multitrack audiotape 20, such as presently used at some amusement parks, to a pre-striped master multitrack audiotape 22, from the pre-striped master multitrack audiotape 22 to a master videotape 24, and, subsequently, from the master videotape 24 to a master laser videodisc 26. The multitrack audiotape 20 is illustrated as having eight tracks of audio, but the process is applicable to any number of tracks. For the present example, it is assumed that four of the tracks contain wide bandwidth audio (Tracks 1-2, 5-6), such as music, and four of the tracks contain narrow bandwidth audio (Tracks 3-4, 7-8), such as narration and sound effects. Furthermore, the eight tracks of audio are assumed to be recorded on the multitrack audiotape 20 in an analog format.

Recording the multiple tracks of audio from the multitrack audiotape 20 onto the master multitrack audiotape 22 requires that the master multitrack audiotape 22 first be pre-striped with an SMPTE timecode and a composite video synchronization signal. These signals form the time base reference for synchronizing the master multitrack audiotape machine with the videotape recorder.

Recording the audio from the master multitrack audiotape 22 onto the master videotape 24 requires two passes of the master multitrack audiotape 22. The first pass records segment 1 and the second pass records segment 2 onto the master videotape 24. Each segment includes two channels of wide bandwidth audio and two channels of narrow bandwidth audio. The two channels of wide bandwidth audio are encoded in a video format by an audio to video encoder 28 before being recorded onto the master videotape 24. In a presently preferred embodiment of the invention, the encoder 28 may be a dbx Model 700 Digital Audio Encoder, manufactured by dbx, Inc., 71 Chapel Street, Newton, Mass. 02195.

The dbx Model 700 uses a linear-predictive delta modulation scheme to first digitize the two channels of wide bandwidth analog audio. If the master multitrack audiotape 22 is not in an analog format, the two channels of wide bandwidth audio must first be converted into an analog format before being provided as an input to the dbx Model 700 and digitized. The dbx Model 700 then encodes the two digitized tracks of wide bandwidth audio into a standard NTSC (National Television System Committee) video signal.

The recorded master videotape 24 is then used to create a master laser videodisc 26, from which multiple laser videodiscs are made. In a presently preferred embodiment of the invention, both segments are recorded onto a single master videotape 24, which is subsequently used to create a single master laser videodisc 26.

Master laser videodiscs are quite costly and, therefore, it is preferable to place as many segments as possible on the single master laser videodisc. For example, typical laser videodiscs have 30 minutes of playing time. If a show has 8 tracks of audio, or two segments, and a playing time of less than 15 minutes, both segments can be put on the single master laser videodisc. Two identical laser videodiscs are still made from the single master laser videodisc and two synchronized laser videodisc players are still used during playback. However, the first laser videodisc player plays back segment one and the second laser videodisc player plays back segment two.

FIG. 2 illustrates the playback of the two laser videodiscs. The two laser videodiscs are installed in two laser videodisc players 30. A common composite video synchronization signal and subcarrier signal is applied to the two players 30 by a video synchronization signal generator 32, which synchronizes the two players 30 together. At the start of the show, player one is commanded to go to the start of segment one and player two is commanded to go to the start of segment two by a start command 34. During the playback of the two laser videodiscs, the video-encoded wide bandwidth audio is decoded by an audio to video decoder 36. In a presently preferred embodiment of the invention, the previously mentioned dbx Model 700 may be used to decode the video-encoded audio.

FIG. 3 illustrates, in greater detail, the recording of the multiple audio tracks from the master multitrack audiotape 22 onto the master videotape 24. For this transfer, a master multitrack audiotape machine 40 is synchronized with a videotape recorder 42 by regulating the speed of the master multitrack audiotape machine 40, in accordance with a presently preferred embodiment of the invention. The speed of the master multitrack audiotape machine 40 is regulated during the recording process by correlating the video synchronization signal previously recorded onto the master multitrack audiotape 22 with a video synchronization signal 44 controlling the videotape recorder 42 during this recording process. The video synchronization signal 44 is generated by a video synchronization signal generator 46.

The composite video synchronization signal recorded onto the master multitrack audiotape 22 during the pre-striping process is recorded onto the master multitrack audiotape 22 by closing a switch 48. The composite video synchronization signal 44, which is provided as an output by the video synchronization signal generator 46, is filtered by a low pass filter 50 before being recorded onto the master multitrack audiotape 22. The low pass filter 50 is an 18 db/octave filter adjusted to 11 KHz. The low pass filter 50 reduces any possible ringing that may be caused by antialiasing filters in the master multitrack audiotape machine 40, which in a presently preferred embodiment, may be a digital audiotape machine such as a Model M-81 digital audiotape recorder manufactured by the Minicom Division/3M, 3M Center, St. Paul, Minn. 55144.

During the pre-striping process, the speed of the master multitrack audiotape machine 40 is regulated by a master clock signal 52. The master clock signal 52 is derived from a clock signal 54, which is provided as an output by the video synchronization signal generator 46. In a presently preferred embodiment of the invention, a Tektronix NTSC Synch Generator Model 1410, manufactured by Tektronix, Inc., P.O. Box 500, Beaverton, Ore., may be employed as the video synchronization signal generator 46. The Tektronix Model 1410 generates a clock signal 54 at 5.03496 MHz. The 5.03496 MHz clock signal 54 is divided by two and buffered by clock divider/buffer 56 to generate the master clock signal 52 at 2.51748 MHz. The master clock signal 52 is applied to the master multitrack audiotape machine 40 on a clock input line 58 by a switch 60.

Once the master multitrack audiotape 22 has been pre-striped, the audio is transferred from the multitrack audiotape 20 to the master multitrack audiotape 22. The audio can then be transferred to the master videotape 24, four channels at a time. For this transfer, the master videotape 24 is first pre-striped with the same SMPTE timecode and composite video synchronization signal as the master multitrack audiotape 22. The master multitrack audiotape machine 40 is then coarsely synchronized with the videotape recorder 42 by a synchronizer 62. The synchronizer 62 controls the speed of the master multitrack audiotape machine 40 when the variable frequency output of the synchronizer 62 is applied to the audiotape machine 40 on the clock input line 58 by switch 60. In a presently preferred embodiment of the invention, the synchronizer 62 may be a Cipher Digital Shadow System Synchronizer, manufactured by Cipher Digital, 150 Huntington Avenue, Boston, Mass. 02115.

The BTX Synchronizer is a conventional SMPTE synchronizer and uses the SMPTE timecode pre-striped on both the master multitrack audiotape 22 and the master videotape 24 to perform the coarse synchronization between the two machines. The output of the BTX Synchronizer is a variable frequency from 15 Hz to 40 KHz and must, therefore, be increased sufficiently to operate in the 2.5 MHz range for proper speed control of the master multitrack audiotape machine 40. The synchronization performed by the synchronizer 62 results in a phase accuracy between the two machines of approximately one hundredth of an SMPTE frame.

Once the coarse synchronization has been accomplished, fine synchronization is performed by regulating the speed of the master multitrack audiotape machine 40 with the 2.5 MHz master clock signal 52, rather than with the synchronizer 62. The 2.5 MHz master clock signal 52 is applied to the clock input line 58 of the audiotape machine 40 through a phase locked loop 64 by the switch 60. The composite video synchronization signal previously recorded onto the master multitrack audiotape 22 is output by the master multitrack audiotape machine 40 and compared on an oscilloscope 66 with the video synchronization signal 44 output from the video synchronization signal generator 46. Because the video synchronization signal output by the master multitrack audiotape machine 40 was filtered by the low pass filter 50 before being recorded onto the master multitrack audiotape 22, the video synchronization signal 44 likewise must be filtered by the low pass filter 50 before being compared on the oscilloscope 66.

The frequency of the 2.5 MHz master clock signal 52 is then adjusted by the phase locked loop 64 to vary the speed of the master multitrack audiotape machine 40 until the vertical and horizontal, synchronization pulses included in the composite video synchronization signal on the master multitrack audiotape 22 are aligned with the vertical and horizontal, synchronization pulses included in the composite video synchronization signal 44. This accurately synchronizes the master multitrack audiotape machine 40 with the videotape recorder 42. FIG. 4 illustrates a sampling of such synchronization pulses in the composite signal before and after the synchronization process.

The four channels of audio from the master multitrack audiotape 22 can then be selected and recorded onto the master videotape 24, using the audio to video encoder 28 to encode the two channels of wide bandwidth audio. The audio to video encoder 28 is also controlled by the video synchronization signal 44. The recording process can be repeated, over and over again, until all of the audio channels have been transferred to the master videotape 24, from which the master laser videodisc 26 is made.

The multiple laser videodiscs are produced from the master laser videodisc 26, and played back by the synchronized multiple laser videodisc players 30. The various animated and theater shows recorded on the laser videodiscs can now be repeatedly played back without any degradation in the quality of the recording over time. Furthermore, because the laser videodisc players operate with little maintenance and good reliability, the animated and theater shows will require little attention by maintenance personnel.

From the foregoing it will be appreciated that the present invention provides a highly accurate method and apparatus for synchronizing a multitrack audiotape machine with a videotape recorder. Although a presently preferred embodiment of the invention has been illustrated and described, by way of example, it will be apparent that other adaptations and modifications can be made without departing from the spirit and scope of the invention. For example, the size or format of the disc is not critical and the invention may be applied to compact discs as well as laser videodiscs. Accordingly, the invention is not to be limited, except as by the following claims.

What is claimed is:

1. A method for synchronizing an audio tape machine with a video tape machine while recording audio from an audio tape onto a video tape comprising the steps of:
    recording a first composite video synchronization signal on said audio tape, said first composite video synchronization signal containing both vertical and horizontal synchronization signals;
    recording a first SMPTE type time code on said audio tape;
    recording a second SMPTE type time code on said video tape;
    generating a second composite video synchronization signal, said second composite video synchronization signal containing both vertical and horizontal synchronization signals;
    generating a clock signal;
    coarsely adjusting the speed of said audio tape machine with respect to the speed of said video tape machine responsive to the synchronization of the signals of said first SMPTE type time code and said second SMPTE type time code;
    accurately synchronizing the speed of said audio tape machine with said video tape machine subsequent to said coarse adjustment of the speed of said audio tape machine by adjusting the frequency of said clock signal to synchronize first, the phase of said vertical synchronization signal of said first composite video synchronization signal with the phase of said vertical synchronization signal of said second composite video synchronization signal, and second, the phase of said horizontal synchronization signals of said first and second composite video synchronization signals; and,
    recording audio signals from said audio tape onto said video tape.

2. The method of claim 1 wherein the step of accurately synchronizing the speed of said audio tape machine with said video tape machine by adjusting the frequency of said clock signal to synchronize the phase of first said vertical and then said horizontal synchronization signals of said first composite video synchronization signal with the phase of first said vertical and then said horizontal synchronization signals of said second composite video synchronization signal includes the step of:
    comparing the waveform of said vertical and said horizontal synchronization signals of said first composite video synchronization signal with the waveform of said vertical and said horizontal synchronization signals of said second composite video synchronization signal on a means to display the relative phase of said signals and altering the frequency of said clock signal to minimize the difference between the phase of first said vertical synchronization signals and then said horizontal synchronization signals of said first and second composite video synchronization signals.

3. The method of claim 2 wherein said step of altering the frequency of said clock signal includes the step of:
    changing the frequency of said clock signal in response to said difference by means of a phase lock loop.

4. An apparatus for synchronizing the speed of an audio tape machine and a video tape machine comprising:
    means for generating a first composite video synchronization signal having both vertical and horizontal synchronization signal components coupled to said video tape machine for regulating the speed of said video tape machine, said video tape machine having a video tape with a SMPTE type code recorded thereon;
    means for generating a clock signal for accurately regulating the speed of said audio tape machine, said audio tape machine having an audio tape with a SMPTE type time code and a second composite video synchronization signal having both vertical and horizontal synchronization signal components recorded thereon;
    means for coarsely regulating the speed of said audio tape machine being coupled to both said audio tape machine and said video tape machine for receiving as input said SMPTE type time codes from both said audio tape and said video tape, said means to coarsely regulate the speed of said audio tape machine being further coupled to said audio tape machine for output of a speed control signal to said audio tape machine responsive to the synchronization of said SMPTE type time codes recorded on said audio and video tapes;

means for comparing the phase of both said vertical and horizontal synchronization signal components of said first composite video synchronization signal with both said vertical and horizontal synchronization signal components of said second composite video synchronization signal coupled to said audio tape machine and said means for generating said first composite video synchronization signal; and, means for accurately regulating the speed of said audio tape machine serially coupled between said means to generate said clock signal and said audio tape machine for varying the frequency of said clock signal responsive to first said comparison of said phase of said vertical synchronization signal component of said first composite video synchronization signal with said vertical synchronization signal component of said second composite video synchronization signal, followed by said comparison of said phase of said horizontal synchronization signal component of said first composite video synchronization signal with said horizontal synchronization signal component of said second composite video synchronization signal.

5. The apparatus of claim 4 where said means for comparing the phase of said first composite video synchronization signal with said second composite video synchronization signal recorded on said audio tape on said audio tape machine comprises:

means for displaying the phase of both said vertical and horizontal synchronization signal components of said first composite video synchronization signal relative to the phase of both said vertical and horizontal synchronization signal components of said second composite video synchronization signal.

6. The apparatus of claim 4 in which said means for accurately regulating the speed of said audio tape machine further comprises:

a phase lock loop.

7. The apparatus of claim 4 in which said means for comparing said phase of said vertical and horizontal synchronization signal components of said first composite video synchronization signal and said second composite video synchronization signal further comprises:

an oscilloscope.

* * * * *